(12) United States Patent  (10) Patent No.: US 7,570,974 B2
Kaltenbach et al.  (45) Date of Patent: Aug. 4, 2009

(54) BLUETOOTH® ENABLED HEARING AID

(75) Inventors: Matt Andrew Kaltenbach, Cary, NC (US); Steven G. Coston, Raleigh, NC (US); Robert Anthony Campitello, Kirkville, NY (US)

(73) Assignee: Sony Ericsson Mobile Communications AB, Lund (SE)

( * ) Notice: Subject to any disclaimer, the term of this patent is extended or adjusted under 35 U.S.C. 154(b) by 139 days.

(21) Appl. No.: 11/754,397

(22) Filed: May 29, 2007

(65) Prior Publication Data

US 2007/0225050 A1   Sep. 27, 2007

Related U.S. Application Data

(62) Division of application No. 10/674,747, filed on Sep. 30, 2003, now Pat. No. 7,257,372.

(51) Int. Cl.
*H04M 1/00* (2006.01)
*H04B 7/00* (2006.01)
(52) U.S. Cl. ............... 455/569.1; 455/41.2; 455/570
(58) Field of Classification Search ........... 455/41.2, 455/569.1, 570, 631, 114.2, 222, 278.1, 283, 455/501, 63.1, 278.2; 381/312, 315, 317, 381/71.1
See application file for complete search history.

(56) References Cited

U.S. PATENT DOCUMENTS 6,804,213 B2 * 10/2004 Zimmermann et al. ...... 370/332
6,868,284 B2 * 3/2005 Bae .......................... 455/575.2
7,046,799 B2 * 5/2006 Ma .......................... 379/433.13
7,110,535 B2 * 9/2006 Bodley et al. ............... 379/430
7,110,799 B1 * 9/2006 Willins et al. ............. 455/575.2
7,248,902 B2 * 7/2007 Chu ......................... 455/569.1
7,292,880 B2 * 11/2007 Lehtonen .................. 455/569.1
2003/0045283 A1 * 3/2003 Hagedoorn ................. 455/426
2005/0135644 A1 * 6/2005 Qi ............................. 381/314
2006/0165243 A1 * 7/2006 Lee ............................. 381/74
2007/0225049 A1 * 9/2007 Andrada ................. 455/569.1
2008/0013763 A1 * 1/2008 Lotter et al. ................ 381/315
2008/0165994 A1 * 7/2008 Caren et al. ................ 381/312
2008/0226104 A1 * 9/2008 Hedstrom ................... 381/311

* cited by examiner

*Primary Examiner*—Sonny Trinh
(74) *Attorney, Agent, or Firm*—Coats & Bennett, P.L.L.C.

(57) ABSTRACT

The present invention relates to a method and apparatus for improving interference suppression processing and control in hearing aids communicating with a mobile station over a short-range wireless network. The hearing aid includes an acoustic echo canceller to suppress acoustic echo from the input audio signals. The mobile station also includes an echo canceller, and may include one or more switching circuits to bypass the echo canceller when the mobile station communicates with the hearing aid via the short-range wireless network. Typically, when the short-range wireless network between the hearing aid and the mobile station is established, the hearing aid and the mobile station negotiate one or more short-range wireless network profiles to determine the properties of the echo cancellers.

24 Claims, 11 Drawing Sheets

BLUETOOTH® ENABLED HEARING AID

RELATED APPLICATION

This application is a divisional of U.S. patent application Ser. No. 10/674,747 filed Sep. 30, 2003, which is incorporated herein by reference.

BACKGROUND OF THE INVENTION

The present invention relates generally to a local wireless device that communicates with a mobile station, and more particularly to a hearing aid that communicates with the mobile station via a short-range ad hoc wireless network.

The popularity of mobile stations, such as cellular telephones, personal data assistants (PDAs), etc., continues to increase each year. To maintain this trend, manufacturers continue to explore ways to make mobile stations appeal to a larger percentage of the population. One area of focus involves the use of local wireless devices, such as wireless headsets, with near-end mobile stations.

Current wireless headsets convert microphone signals to signals compatible with the short-range wireless network and transmit the processed signals to a near-end mobile station via the short-range wireless network. Similarly, the wireless headsets convert signals received from the near-end mobile station to signals compatible with a speaker in the wireless headset. Current wireless headsets do not include any additional processing. As a result, the near-end mobile station performs all interference processing, such as acoustic echo and/or environmental noise suppression. Because the sources of the acoustic echo and the environmental noise are in the wireless headset, the noise suppression performed by the near-end mobile station may be insufficient, causing undesirable noise to transmit to a far-end user.

Another area of focus involves the use of mobile stations by the hearing impaired. Current hearing aids comprise low power receivers that typically pick up background noise and radiated electro-magnetic interference (EMI) from mobile stations, particularly when the mobile station is in close proximity to the hearing aid. These problems are particularly problematic for high gain hearing aids because the higher the hearing aid gain, the more susceptible the hearing aid is to interference. Interference problems between hearing aids and mobile stations are well known and discussed in further detail in U.S. Pat. No. 6,122,500 to Paul Dent et al., the contents of which are hereby incorporated by reference. As a result, it is desirable to provide a hearing aid that is also capable of interacting with one or more mobile stations without producing undesirable interference.

One approach to this problem uses a short-range wireless network, such as a Bluetooth® network, to provide a short-range communication link between a hearing aid and a mobile station. Bluetooth® is a universal radio interface that enables two or more wireless devices to communicate wirelessly via short-range ad hoc networks. Bluetooth® uses a polling based communication infrastructure to transmit digital data between the wireless devices. Jaap Haartsen in Ericsson Review No. 3, 1998, provides further details regarding Bluetooth® technology in "Bluetooth®—The universal radio interface for ad hoc, wireless connectivity," which is herein incorporated by reference. Because Bluetooth® enables communication between a hearing aid and a mobile station while providing a physical distance between the two wireless devices, the undesirable interference between the hearing aid and the mobile station is diminished and/or prevented.

Accordingly, one embodiment of the present invention incorporates additional processing in a wireless headset to improve noise suppression between wireless devices communicating in a short-range wireless network. One embodiment of the wireless headset may comprise a hearing aid to enable hearing-impaired individuals to utilize wireless devices without experiencing undesirable interference.

SUMMARY OF THE INVENTION

The present invention relates to a method and apparatus for improving interference suppression processing in local wireless devices, such as wireless headsets, communicating with a mobile station over a short-range wireless network. The local wireless device and the mobile station each include a short-range wireless transceiver for communicating information signals via the short-range wireless network. Further, both the local wireless device and the mobile station include a microphone system to receive input audio signals and a speaker to project output audio signals to a local user. The local wireless device includes interference suppression circuitry (ISC), such as an acoustic echo canceller and/or a noise suppressor, to suppress interference signals, such as acoustic echo and/or environmental noise, from the input audio signal. Exemplary local wireless devices may also include one or more audio processors to process output audio signals. The audio processor(s) may include an equalizer, a limiter, and/or an automatic level control.

The mobile station also includes an audio processor and ISC. Further, the mobile station may include one or more switching circuits to bypass one or more of the elements within the mobile station's audio processor and/or ISC when the mobile station communicates with the local wireless device(s) via the short-range wireless network. Typically, when the short-range wireless network is established between the local wireless device(s) and the mobile station, the local wireless device(s) and the mobile station may negotiate one or more short-range wireless network profiles. Such profiles may determine what elements, if any, of the mobile station's audio processor and/or ISC are bypassed. Further, such profiles may define acoustic processing parameters used to interface input and output signals to the remote network of the mobile station. The mobile station may control the one or more switching circuits and/or acoustic processing parameters based on the negotiated profile(s).

In one embodiment of the present invention, the local wireless device comprises a hearing aid. The hearing aid may include a microphone and a speaker operatively connected to the short-range wireless transceiver electronics. Alternatively, the local wireless device may include switching circuitry to connect the speaker and microphone of the hearing aid to the short-range wireless transceiver electronics within the local wireless device when in a communication mode. Furthermore, the switching circuitry in the mobile station and in the local wireless device may switch, in tandem, a profile of acoustic processing constants. When in a hearing aid mode, the switching circuitry may disconnect the speaker and the microphone from the short-range wireless transceiver electronics.

DETAILED DESCRIPTION OF THE INVENTION

Figure 1:
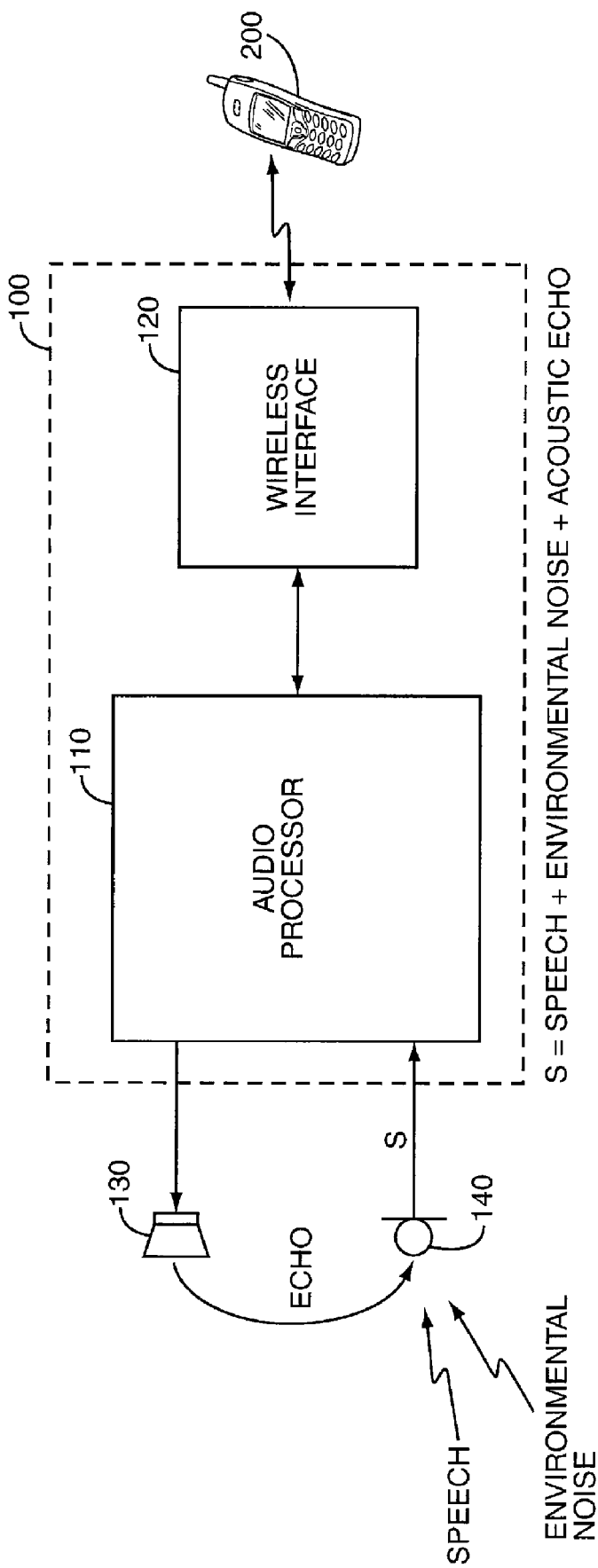
FIG. 1 illustrates a block diagram of a conventional wireless headset.

FIG. 1 illustrates a conventional local wireless device 100 that includes audio processing circuits 110 and a wireless interface 120, such as a Bluetooth® interface, for processing, transmitting, and receiving RF signals. Audio processing circuits 110 provide basic audio output to speaker 130 and receive audio input from microphone 140. As shown in FIG. 1, microphone 140 detects various external audio signals, such as speech signals from a near-end user, echo signals from speaker 130, and noise from the environment.

Local wireless device 100 communicates information with a near-by mobile station 200 via a short-range wireless network. Because it is desirable to transmit only the speech signals to a remote far-end user, mobile station 200 typically includes an interference suppression processor (not shown) to suppress the acoustic echo and/or the environmental noise discussed above. Commonly assigned U.S. Pat. Nos. 6,148,078, 6,160,886, and 6,570,985 provide exemplary echo and noise suppression techniques, and are herein incorporated by reference. Interference cancellation techniques are well known in the art, and therefore, are not discussed further herein.

Figure 2:
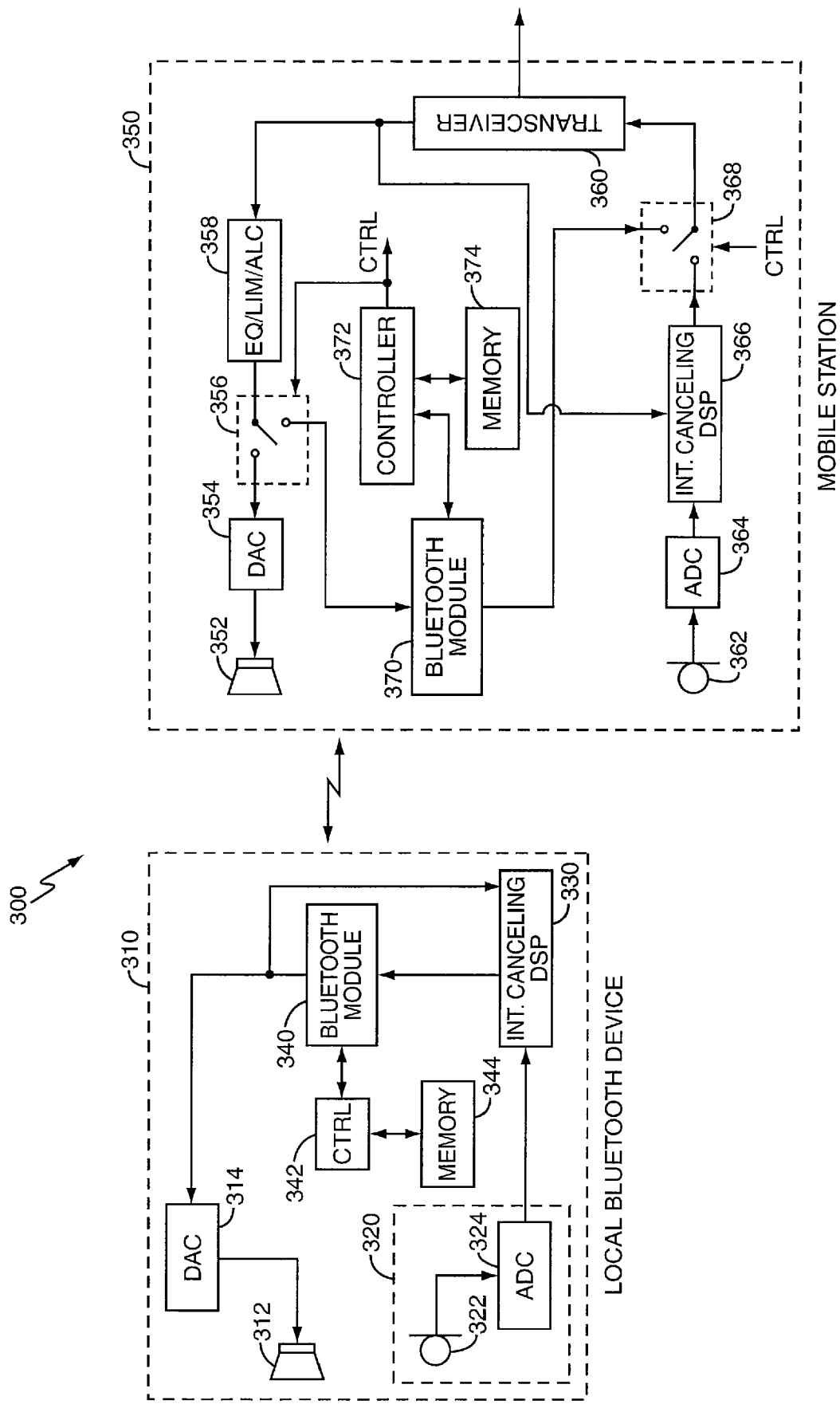
FIG. 2 illustrates an embodiment of a short-range wireless system according to the present invention.
Figure 3:
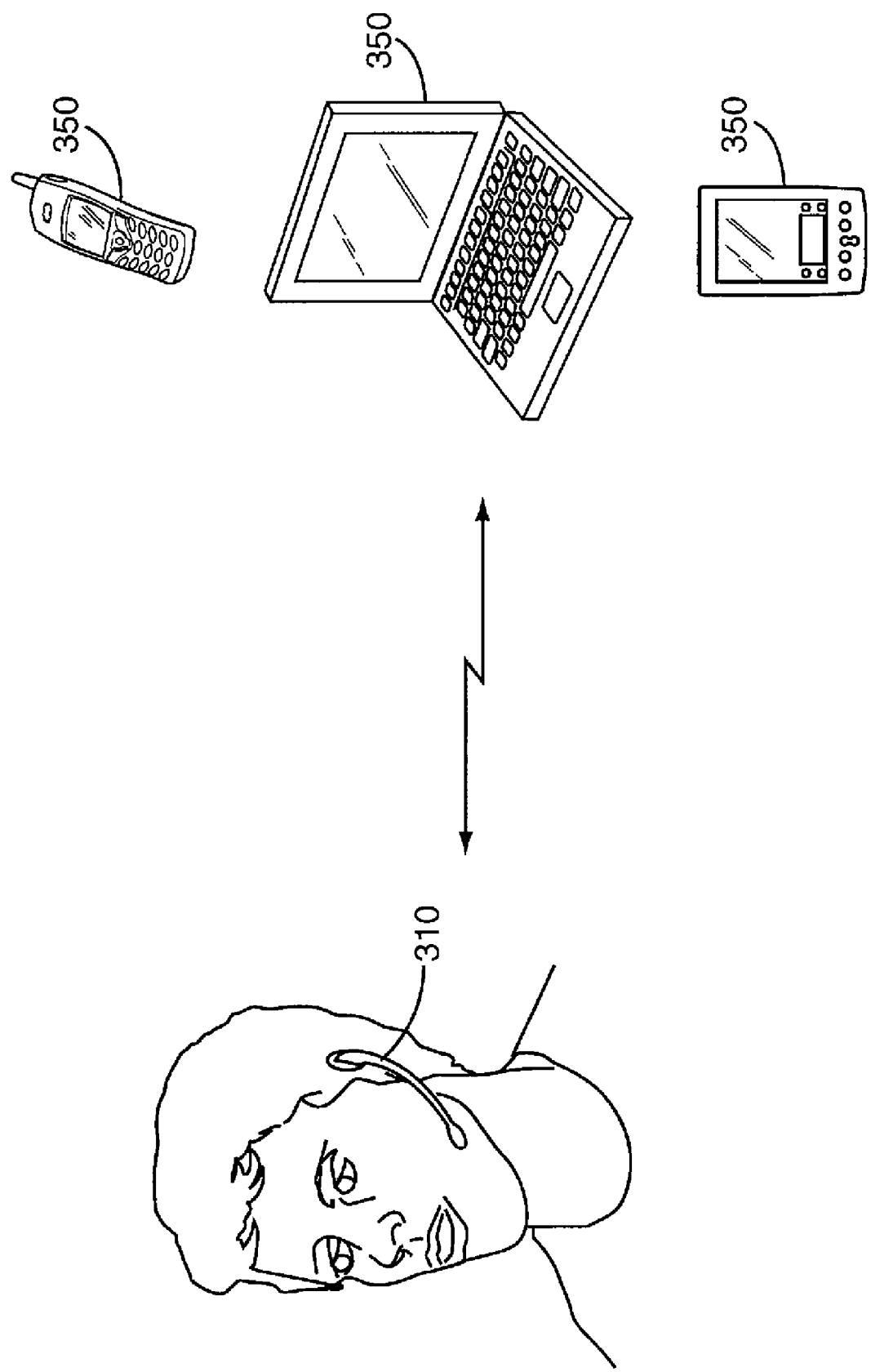
FIG. 3 illustrates a short-range wireless headset according to the present invention interfacing with various short-range wireless terminals.

FIG. 2 illustrates an exemplary short-range ad hoc wireless system 300 according to the present invention. The short-range wireless system 300 comprises a local wireless device, such as a Bluetooth® device 310, and a mobile station 350. The Bluetooth® device 310 may comprise a Bluetooth® headset. While the present application uses the term "Bluetooth® network" to refer to the short-range ad hoc wireless network, those skilled in the art will appreciate that the present invention is not limited to Bluetooth® networks and may be applied to any short-range wireless network. Further, as used herein, mobile station 350 may include one or more wireless devices, such as a cellular telephone, a Personal Data Assistant (PDA), a conventional laptop or palmtop with a wireless transceiver, as shown in FIG. 3, or any other device capable of wireless communications. Further, one skilled in the art will appreciate that more than one remote Bluetooth® device 310 may communicate with a single mobile station 350.

Mobile station 350 includes a cellular transceiver 360 for transmitting and receiving information signals. Transceiver 360 may operate according to any known standard, including GSM, TIA/EIA-136, cdmaOne, IS-95, cdma2000, UMTS, or Wideband CDMA. Microphone 362 is coupled to transceiver 360 via an input signal path; speaker 352 is coupled to transceiver 360 via an output signal path. Input signal path includes microphone 362, analog to digital converter (ADC) 364, interference-canceling digital signal processor (DSP) 366, and switch 368. Output signal path includes audio processor 358, switch 356, digital to analog converter (DAC) 354, and speaker 352.

Mobile station 350 further includes a short-range wireless network module, such as a Bluetooth® module 370, controller 372, and a memory 374. Controller 372 actuates switches 356 and 368 and controls Bluetooth® module 370 based on a desired mode of operation. Negotiated Bluetooth® profiles defined during initial setup may determine the desired mode of operation. Computer program instructions and data required for operation of mobile station 350 are stored in memory 374. Memory 374 represents the entire hierarchy of memory in a mobile station 350, and may include both random access memory (RAM) and read-only memory (ROM). While Bluetooth® module 370, controller 372, and memory 374 are illustrated as separate devices, those skilled in the art will appreciate that one or more of these devices may be incorporated into one or more programmable devices, such as an ASIC.

Mobile station 350 operates in either a normal mode or a local wireless mode. When mobile station 350 operates in a normal mode, switch 368 operatively connects an output of interference canceling DSP 366 to an input of transceiver 360, and switch 356 operatively connects an output of audio processor 358 to an input of DAC 354. ADC 364 converts analog audio signals received by microphone 362 to digital audio signals. Interference canceling DSP 366 then processes the digitized audio signals to suppress interference, such as acoustic echo and/or environmental noise, according to interference canceling techniques well known in the art. The interference-suppressed signals are then transmitted to a remote far-end user via transceiver 360. Audio processor 358, which includes an equalizer (EQ), a limiter (LIM), and/or an automatic level controller (ALC), processes audio information received from a remote far-end user via transceiver 360 according to methods known in the art. DAC 354 converts the processed digital signal into an output analog audio signal, and speaker 352 projects the analog signal to the local near-end user.

When mobile station 350 is operating in a local wireless mode, switch 368 operatively connects Bluetooth® module 370 to transceiver 360, while switch 356 operatively connects an output of audio processor 358 to an input of Bluetooth® module 370. In local wireless mode, mobile station 350 transmits information from the mobile station 350 to Bluetooth® device 310, via Bluetooth® module 370. Further, mobile station 350 receives information, such as negotiated acoustic processing constants, from Bluetooth® device 310 at Bluetooth® module 370, per conventional Bluetooth® protocol and the negotiated profiles, as discussed further below.

Figure 8:
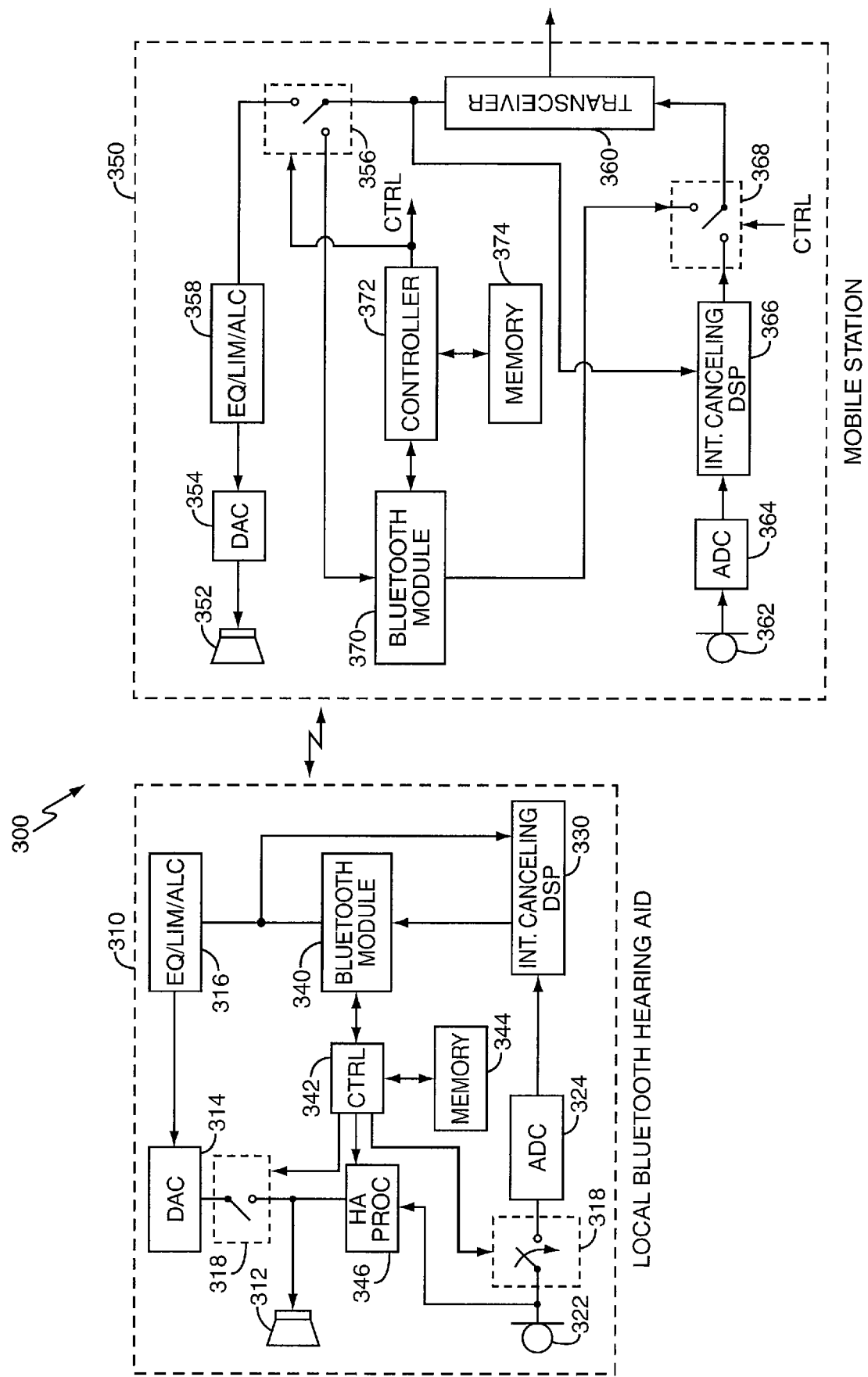
FIG. 8 illustrates another embodiment of a short-range wireless system according to the present invention.

Bluetooth® device 310 includes a speaker 312, digital-to-analog converter (DAC) 314, microphone system 320, interference canceling DSP 330, and a short-range wireless network module, such as a Bluetooth® module 340. Bluetooth® device 310 also includes a controller 342 and memory 344 to control Bluetooth® module 340. Controller 342 controls Bluetooth® module 340 based on a desired mode of operation. Negotiated Bluetooth® profiles defined during initial setup may determine the desired mode of operation and/or set interference suppression parameters in the local wireless interference canceling DSP 330 and/or define interference suppression parameters for the mobile station's interference canceling DSP 366 or audio processor 358. Further, controller 342 may also actuate switches 318, 322 (FIG. 8). As with the memory 374 in mobile station 350, memory 344 stores computer program instructions and data required for operation of Bluetooth® device 310. Memory 344 represents the entire hierarchy of memory in a mobile station 350, and may include both random access memory (RAM) and read-only memory (ROM). While remote Bluetooth® module 340, controller 342, and memory 344 are illustrated as separate devices, those skilled in the art will appreciate that one or more of these devices may be incorporated into one or more programmable devices, such as an ASIC. Further, those skilled in the art will appreciate that Bluetooth® device 310 may comprise a wireless headset or any other short-range wireless device capable of transmitting/receiving audio signals between a user and a mobile station 350 via a short-range wireless network.

Figure 4:
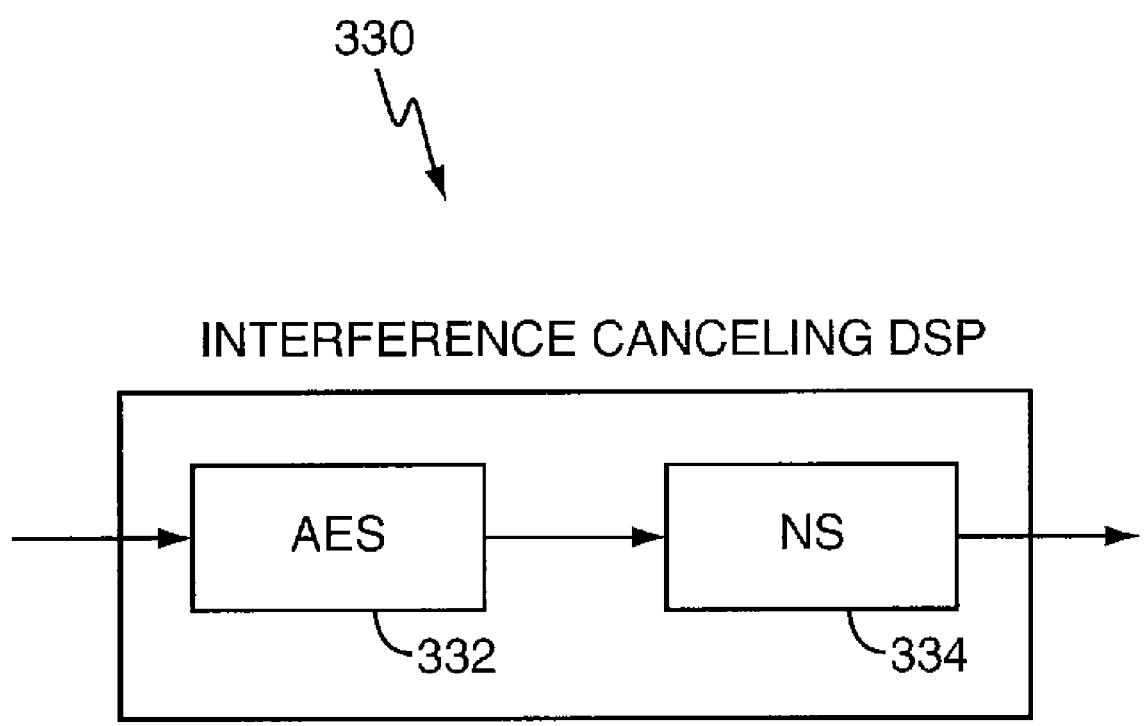
FIG. 4 illustrates an exemplary interference canceling DSP.

As is well understood in the art, remote Bluetooth® module 340 receives digital signals from a nearby mobile station 350 and converts the digital signals into analog audio signals in DAC 314. Speaker 312 outputs the analog audio signals to the near-end user. Microphone system 320 includes at least one microphone 322 and a corresponding ADC 324. Analog audio signals received by microphone 322 are converted to digital signals in ADC 324. The digital signals are then processed in interference canceling DSP 330. As shown in FIG. 4, interference canceling DSP 330 may include any number of interference canceling processors, such as an acoustic echo canceller 332 and/or a noise suppressor 334. Interference canceling DSP 330 receives input audio signals from microphone system 320 and output audio signals from Bluetooth® module 340 and suppresses acoustic echo and/or environmental noise according to suppression techniques known in the art. The echo and/or noise suppressed signals are then transmitted to mobile station 350 via Bluetooth® module 340 for transmission to the remote far-end user.

According to the present invention, Bluetooth® device 310 may negotiate one or more short-range wireless network profiles with mobile station 350. Such negotiations may determine one or more properties of the mobile station's interference canceling DSP 366, the mobile station's audio processor 358, and/or one or more properties of the Bluetooth® device's interference canceling DSP 330. Either the Bluetooth® device 310 or the mobile station 350 may initiate these negotiations. In an exemplary embodiment, the Bluetooth® device 310 initiates the negotiations. As a result, the mobile station's compatibility with regular Bluetooth® devices 310 is maximized. The protocol used during the negotiations may be based on attention (AT) commands, as defined in the Bluetooth® specification. In this scenario, a designer may either alter existing commands or may create new commands. Alternatively, the Bluetooth® device 310 and the mobile station 350 may use a proprietary protocol. In any event, the negotiated profiles of the present invention typically will take place after any standard Bluetooth® negotiations.

During the negotiations, Bluetooth® device 310 determines if mobile station 350 has the capability to bypass the interference canceling DSP 366 in mobile station 350. Further, the Bluetooth® device 310 may also establish interference suppression parameters from the profile negotiations. If mobile station 350 can bypass interference canceling DSP 366, then the mobile station 350 sets up the bypass and deactivates the interference canceling DSP 366 to conserve power in the mobile station 350 and to avoid duplicate processing. If the mobile station can alter the parameters of the interference canceling DSP 366, then the mobile station 350 modifies the parameters of the interference canceling DSP 366. Although not illustrated, those skilled in the art will also appreciate that the negotiations may determine that mobile station 350 may only bypass a limited number of elements, such as the noise suppressor or the echo canceller, within interference canceling DSP 366.

Figure 5:
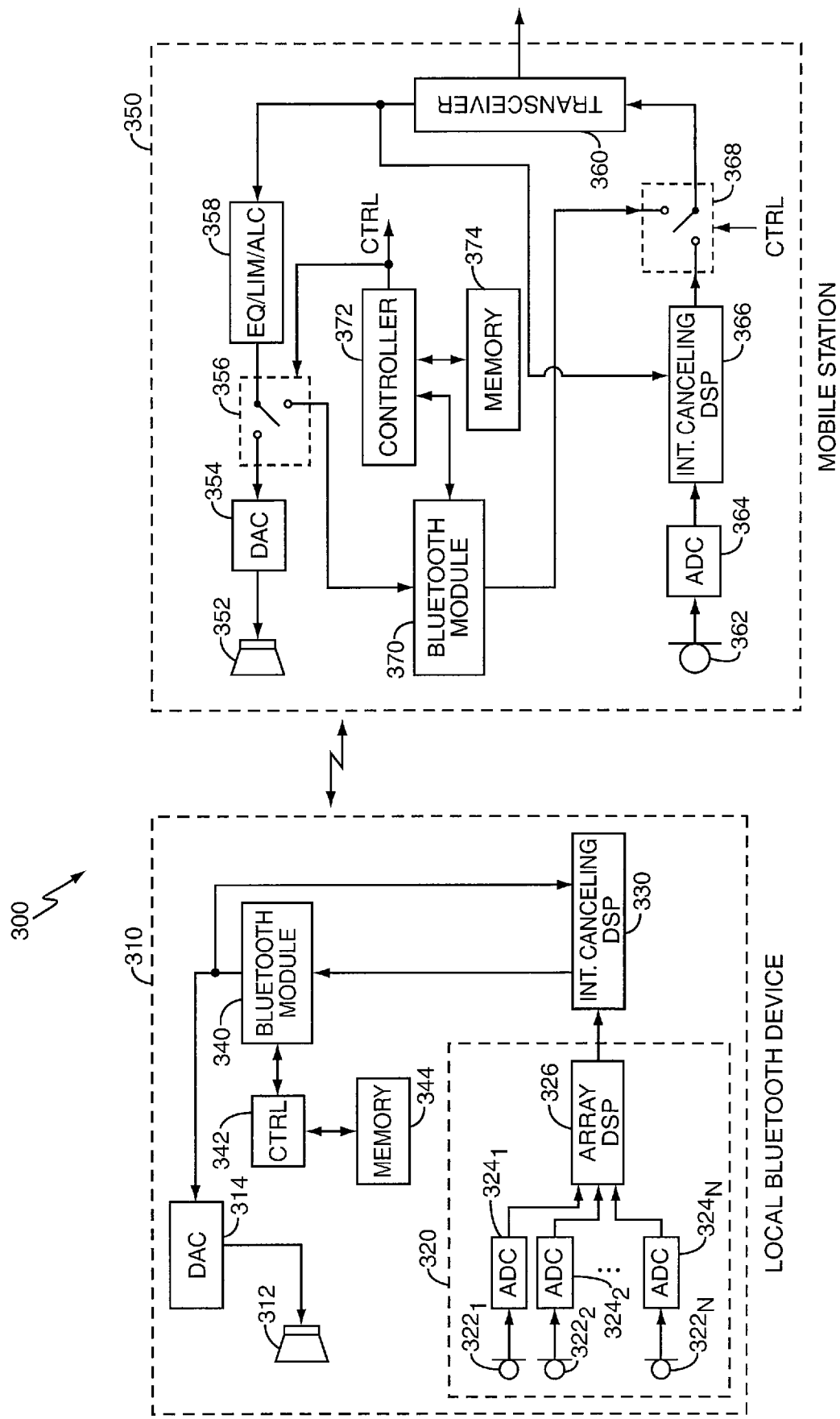
FIG. 5 illustrates another embodiment of a short-range wireless system according to the present invention.

Some interference cancellation techniques utilize multiple microphones 322 to enhance the performance of the interference cancellation. As illustrated in FIG. 5, microphone system 320 in Bluetooth® device 310 may include a plurality of microphones 3221 . . . 322N. Analog audio signals from each of the microphones 3221 . . . 322N are converted to digital signals in a corresponding plurality of ADCs 3241 . . . 324N. Each digital audio signal is combined in microphone array DSP 326 to produce a combined audio signal for interference canceling DSP 330 according to techniques known in the art. Interference canceling DSP 330 then processes the combined audio signal to suppress interference such as acoustic echo and/or environmental noise from the combined audio signal. While not illustrated in FIG. 5, those skilled in the art will appreciate that mobile station 350 may also replace microphone 362 and ADC 364 with a microphone system that includes a plurality of microphones 362, ADCs 364, and a microphone array DSP.

Figure 6:
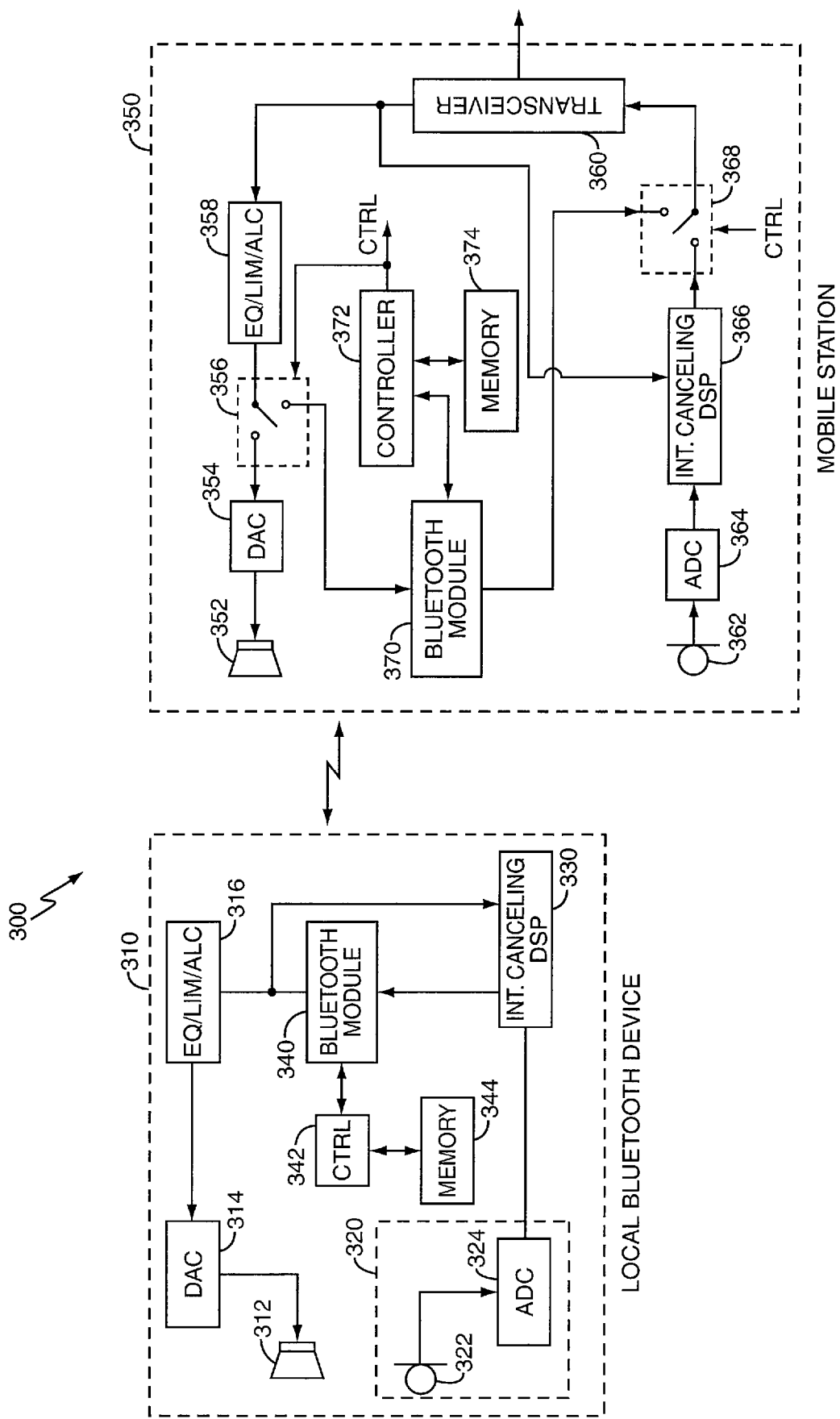
FIG. 6 illustrates another embodiment of a short-range wireless system according to the present invention.
Figure 7:
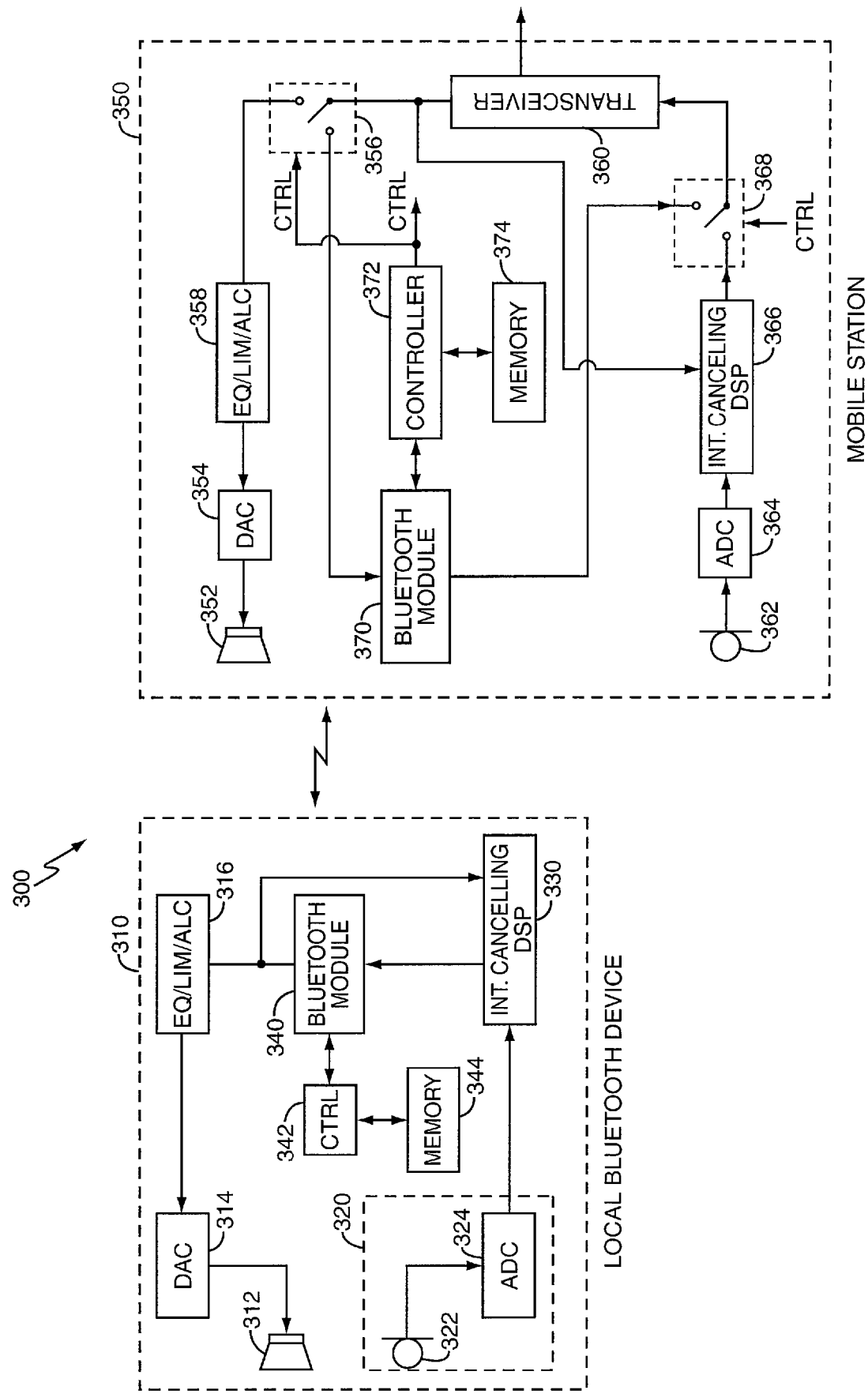
FIG. 7 illustrates another embodiment of a short-range wireless system according to the present invention.

FIGS. 6 and 7 illustrate alternate short-range wireless systems 300 according to the present invention. The operation of mobile station 350 in FIGS. 6 and 7 corresponds to the operation of mobile station 350 in FIG. 2. However, in addition to the components discussed above, the local Bluetooth® device 310 also includes an audio processor 316 similar to the audio processor 358 present in mobile station 350. In FIG. 6, audio processor 358 in mobile station 350 processes the audio signal received by the transceiver 360 as described above. Audio processor 316 further processes the signals received at Bluetooth® module 340 in the Bluetooth® device 310 to enhance the signal quality output by speaker 312.

The configuration shown in FIG. 6 may be a preferred configuration for those more concerned with signal quality than battery life. However, FIG. 7 illustrates an alternate embodiment for users more concerned with battery life. In FIG. 7, Bluetooth® device 310 operates the same as the Bluetooth® device 310 illustrated in FIG. 6. However, in mobile station 350, switch 356 has been moved from the output of audio processor 358 to the output of transceiver 360. In this embodiment, switch 356 connects transceiver 360 to audio processor 358 when mobile station 350 is in normal mode. When in local wireless mode, switch 356 bypasses audio processor 358, and connects Bluetooth® module 370 to transceiver 360. As a result, audio processing only occurs in the mobile station 350 when the mobile station is operating in a normal mode. When in a local wireless mode, mobile station 350 may conserve power by deactivating and bypassing audio processor 358. While not shown, one skilled in the art will appreciate that additional switches may be implemented in mobile station 350 and/or Bluetooth® device 310 to selectively activate or bypass specific elements, such as the EQ, the LIM, or the ALC, of the audio processors 316, 358.

Further, while not shown, it will be appreciated that switch 356 may comprise a switching circuit including multiple switches. When appropriately positioned, switches 356 may enable a user to selectively implement audio processor 358 when signal quality is a high priority, or to bypass audio processor 358 when battery conservation is the high priority.

FIG. 8 illustrates another embodiment of short-range wireless system 300 where Bluetooth® device 310 includes a hearing aid. Mobile station 350 operates as described above in FIG. 7, however, it will be appreciated that any of the mobile station embodiments previously discussed also apply to the embodiment illustrated in FIG. 8. As with the embodiments discussed above, Bluetooth® hearing aid 310 includes the Bluetooth® electronics for receiving/transmitting, processing, and outputting the audio signals as discussed above. In addition, Bluetooth® hearing aid 310 includes a hearing aid processor 346 operatively connected between speaker 312 and microphone 322. Hearing aid processor processes and amplifies audio signals received by microphone 322 according to methods known in the art, and outputs the processed audio signals to a user via speaker 312. While FIG. 8 only illustrates a single microphone 322 in Bluetooth® hearing aid 310 operating as both a hearing aid microphone and a local wireless device microphone, those skilled in the art will appreciate that Bluetooth® hearing aid 310 may include one or more local wireless device microphones 322 separate from the hearing aid microphone 322.

In one embodiment, Bluetooth® hearing aid 310 may optionally include switching circuit 318 to selectively connect microphone 322 and speaker 312 to the Bluetooth® electronics. When in a hearing aid mode, switching circuit 318 operatively disconnects Bluetooth® module 340 from speaker 312 and microphone 322. In this mode, audio signals received by microphone 322 are processed in hearing aid processor 346 and output to the user via speaker 312. When in a Bluetooth® mode, switching circuit 318 operatively connects speaker 312 and microphone 322 to Bluetooth® module 340. In this mode, audio signals received by microphone 322 are processed and transmitted to mobile station 350 while audio signals transmitted from the mobile station 350 are received, processed, and output to the user as described above.

It will be appreciated that each of the embodiments illustrated in FIGS. 5-8 add one new element to the embodiment shown in FIG. 2. Those skilled in the art will also appreciate that the present invention may incorporate one or more of each of these elements into the Bluetooth® device 310 and/or the mobile station 350 of the short-range wireless system 300.

Figure 9:
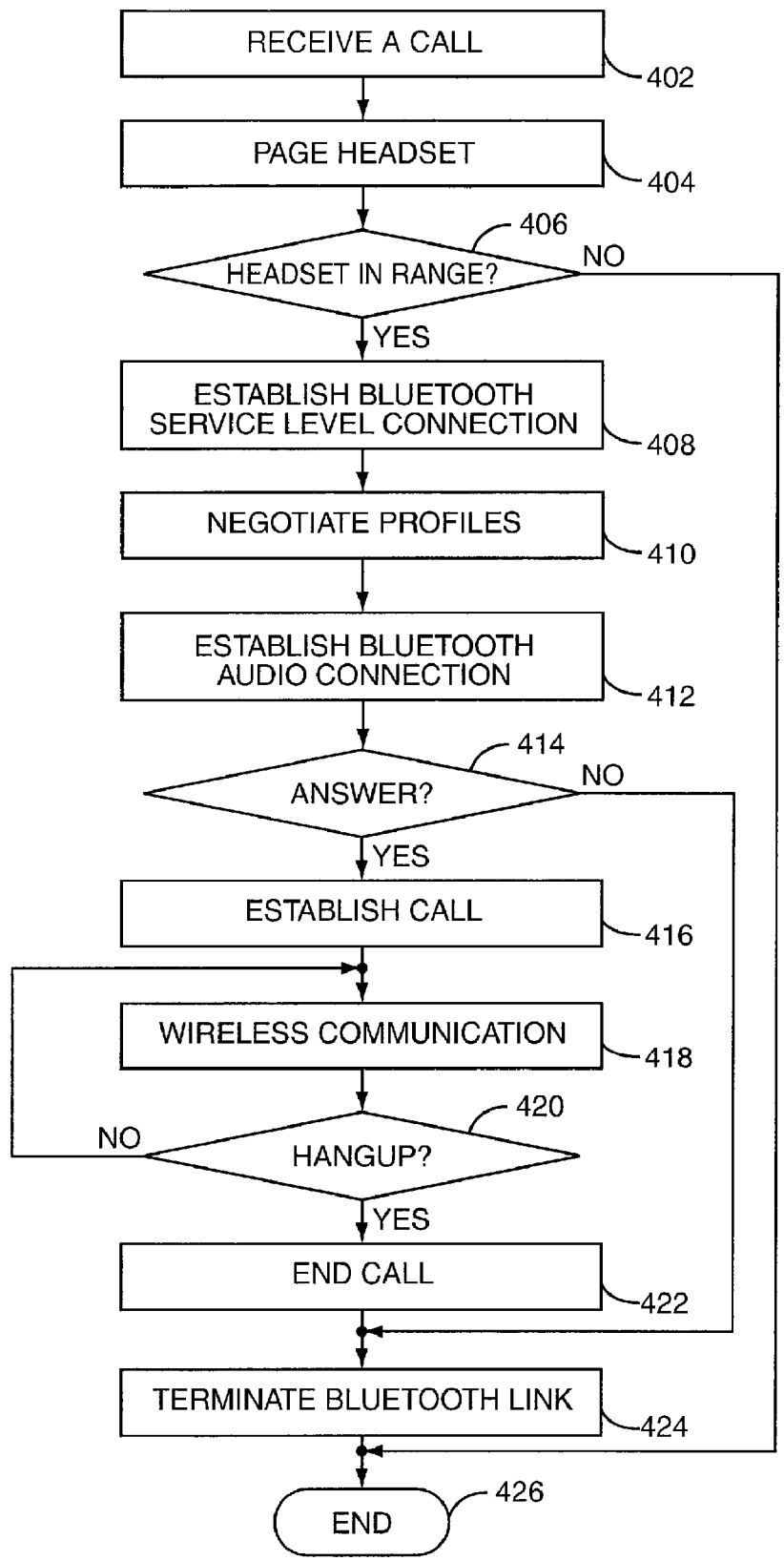
FIG. 9 illustrates a method of receiving a call with a short-range wireless system according to the present invention.
Figure 10:
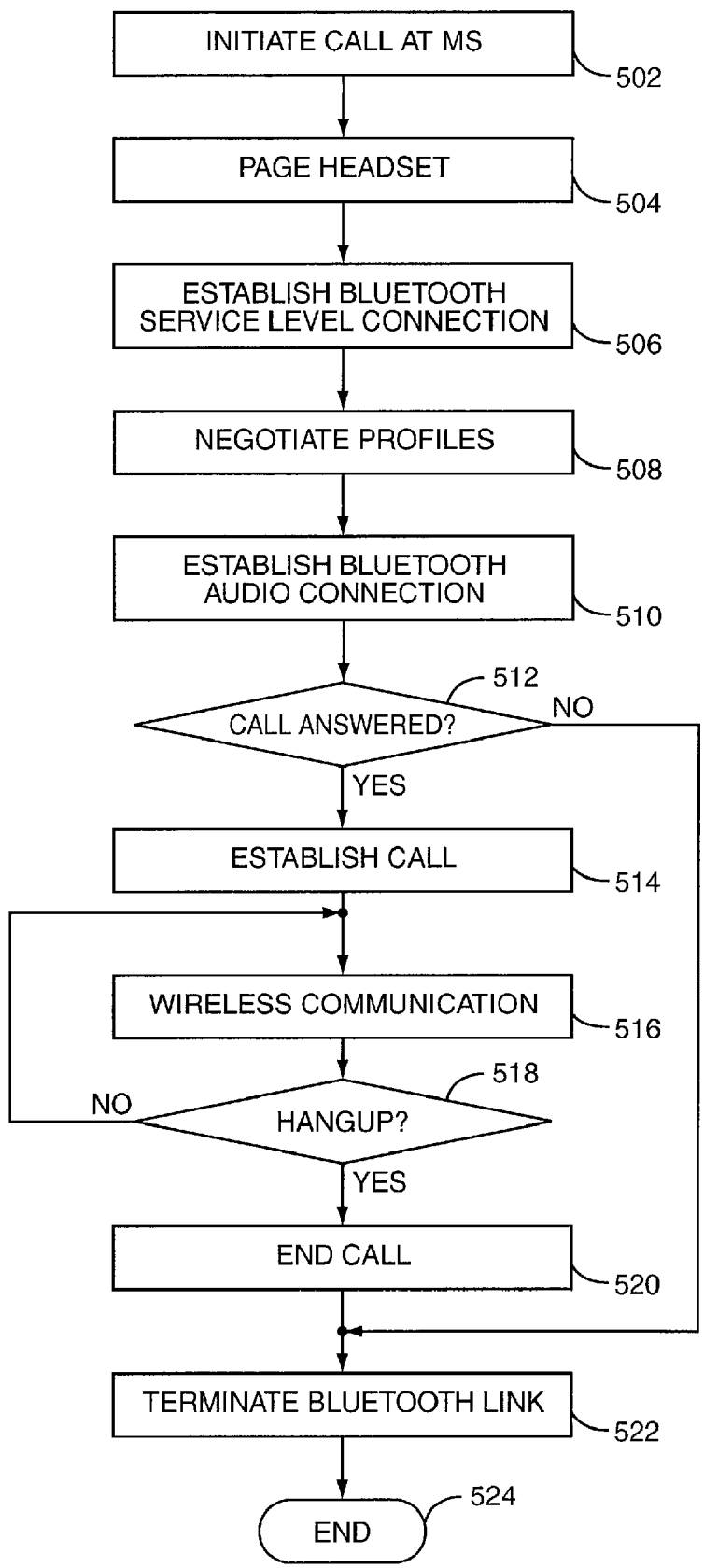
FIG. 10 illustrates a method of placing a call with a Bluetooth® system according to the present invention.
Figure 11:
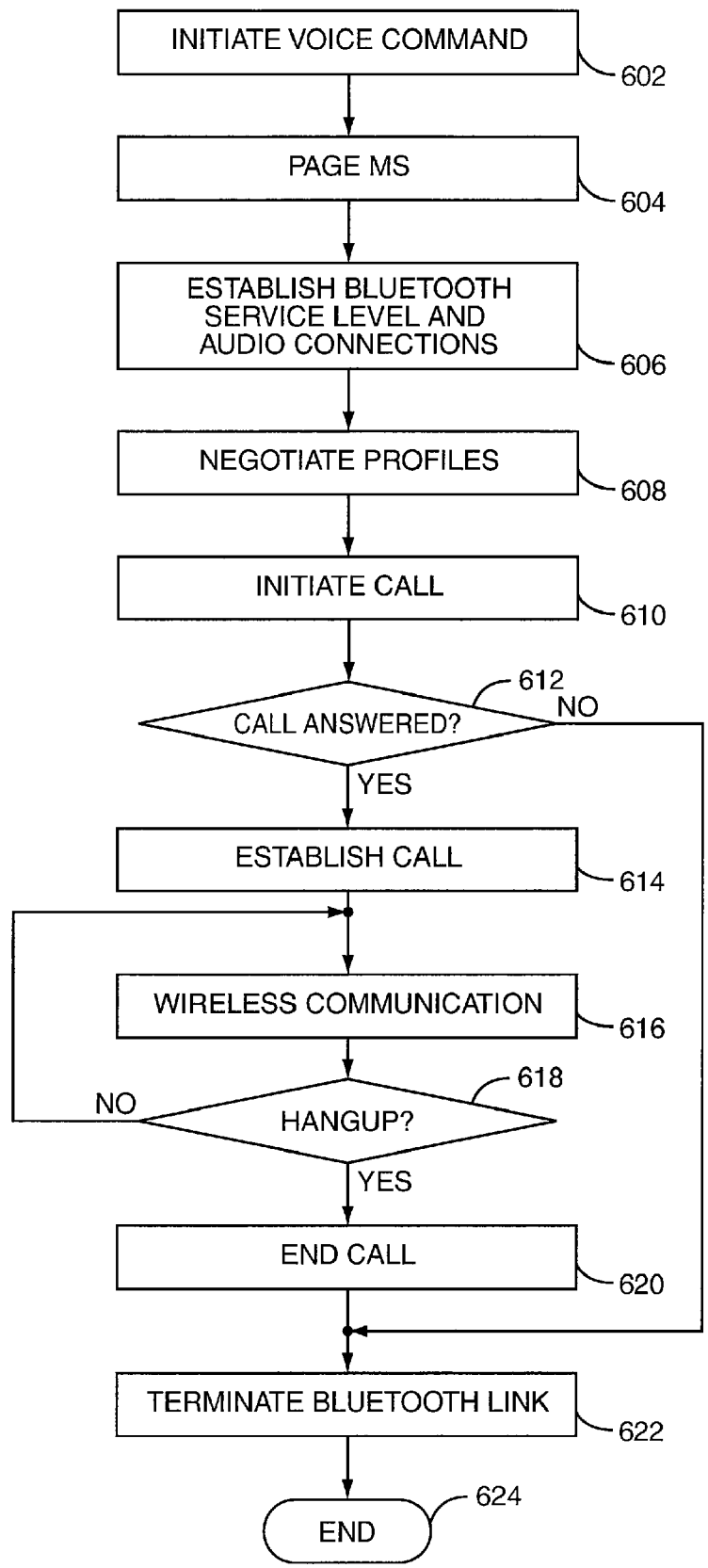
FIG. 11 illustrates another method of placing a call with a Bluetooth® system according to the present invention.

FIGS. 9-11 provide further details as to the method of placing and receiving calls using the short-range wireless system 300 described above. FIG. 9 illustrates a method for receiving calls using the short-range wireless system 300 of the present invention. In response to receiving a call (402), mobile station 350 pages Bluetooth® device 310 (404). If the Bluetooth® device 310 is not in range (406), the process is terminated (426). However, if the Bluetooth® device 310 is in range (406), mobile station 350 establishes a service level Bluetooth® connection (408) with Bluetooth® device 310. Next, Bluetooth® device 310 negotiates one or more short-range wireless network profiles (410) and then establishes the Bluetooth® audio connection (412) based on the negotiated profiles.

Once the Bluetooth® audio connection is established (412), mobile station 350 waits for the user to answer the call (414). The user may answer the call by pressing a button on the mobile station 350, pressing a button on the Bluetooth® device 310, sending an audio command to the mobile station 350 via the Bluetooth® device 310, or by any other means known in the art. If the user does not answer the call (414), the process is terminated (426). If the user answers the call (414), a network connection between the near-end user and a far-end user is established (416) and wireless communication ensues (418) until the near-end user and/or the far-end user hang up (420). After one or more users hang up (420), the network connection and the Bluetooth® links are terminated (422, 424), and the process is terminated (426).

FIGS. 10-11 illustrate two methods for placing a call using short-range wireless system 300. As shown in FIG. 10, the call is initiated at the mobile station 350 (502). The call may be initiated by pressing one or more buttons on a keypad on the mobile station 350 or by any other techniques known in the art. Once the call is initiated (502), mobile station 350 pages Bluetooth® device 310 (504) and establishes a service level Bluetooth® connection (506). After negotiating the short-range wireless network profiles (508), as described above, a Bluetooth® audio connection is established between the mobile station 350 and the Bluetooth® device 310 (510). If a far-end user does not answer the call (512), the Bluetooth® link is terminated (522) and the process ends (524). However, if the far-end user does answer the call (512), a wireless network connection between the near-end user and the far-end user is established (514). Wireless communication occurs between the near-end and far-end users (516) until one or both users hang up (518). After one or both users hang up (518), the wireless network connection and the Bluetooth® link are terminated (520, 522), and the process ends (524).

As shown in FIG. 11, a user may initiate a call at the Bluetooth® device 310 by issuing audio or electrical commands into the microphone of the Bluetooth® device 310 (602). In response, the Bluetooth® device 310 pages the mobile station 350 (604) and establishes service level and audio Bluetooth® connections with the mobile station 350 (606). After negotiating the short-range wireless network profiles (608) the mobile station 350 initiates the call (610). If a far-end user does not answer the call (612), the Bluetooth® link is terminated (622) and the process ends (624). However, if the far-end user answers the call (612), a wireless network connection between the near-end user and the far-end user is established (614). Wireless communication occurs between the near-end and far-end users (616) until one or both users hang up (618). After one or both users hang up (618), the wireless network connection and the Bluetooth® link are terminated (620, 622), and the process ends (624).

The above generally describes the present invention in terms of a single local user placing or receiving a call to a remote far-end user using a local wireless device that communicates with a local mobile station. However, the present invention is not so limited. For example, one skilled in the art will appreciate that the present invention may be incorporated into a system that utilizes voice over Internet protocols (VOIP), where a push-to-talk mechanism is required to initiate signaling from the local wireless device. In this scenario, a profile, which may include audio processing parameters, is negotiated during a first call initialization and is maintained throughout the call. As another example, the present invention may also be incorporated into a multiple user system, such as in GPRS or in multiple VOIP. It will be appreciated that in this scenario, each local wireless device and/or mobile station may comprise a different set of acoustic processing parameters.

The present invention may, of course, be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A local wireless device compatible with a mobile station, the local wireless device comprising:

a short-range wireless transceiver to communicate information signals with the mobile station via a short-range wireless network;

a speaker operatively connected to an output of the short-range wireless transceiver to project output audio signals to a user;

at least one microphone operatively connected to an input of the short-range wireless transceiver to convey input audio signals from the user to the short-range wireless transceiver; and interference suppression circuitry operatively connected between the at least one microphone and the short-range wireless transceiver to suppress interference signals from the input audio signals, wherein a controller coupled to said short-range wireless transceiver negotiates with the mobile station to determine properties of said interference suppression circuitry.

2. The local wireless device of claim 1 wherein the controller determines that the interference suppression circuitry comprises noise suppression circuitry based on the negotiations.

3. The local wireless device of claim 1 wherein the controller determines that the interference suppression circuitry comprises acoustic echo suppression circuitry based on the negotiations.

4. The local wireless device of claim 1 wherein the controller determines that the interference suppression circuitry comprises acoustic echo suppression and noise suppression circuitry based on the negotiations.

5. The local wireless device of claim 1 wherein the at least one microphone comprises a microphone array.

6. The local wireless device of claim 1 further comprising audio processing circuitry operatively connected between the speaker and the short-range wireless transceiver to process signals received by the short-range wireless transceiver.

7. The local wireless device of claim 6 wherein the audio processing circuitry includes at least one of an equalizer, a limiter, and an automatic level control.

8. The local wireless device of claim 1 wherein the controller further negotiates one or more profiles of the short-range wireless network with the mobile station.

9. The local wireless device of claim 1 wherein the local wireless device comprises a wireless headset.

10. A method of establishing a short-range wireless network connection between a local wireless device and a mobile station, the method comprising:

initiating said short-range wireless network connection;

negotiating properties of one or more interference suppression circuits disposed within at least one of the local wireless device and the mobile station;

establishing the short-range wireless network connection; and configuring the short-range wireless network connection based on the negotiated properties of the one or more interference suppression circuits.

11. The method of claim 10 wherein initiating said short-range wireless network connection comprises paging the local wireless device with the mobile station.

12. The method of claim 10 wherein initiating said short-range wireless network connection comprises paging the mobile station with the local wireless device.

13. The method of claim 10 wherein configuring the short-range wireless network connection comprises activating at least one of said interference suppression circuits in the local wireless device based on the negotiated properties of the one or more interference suppression circuits.

14. The method of claim 13 wherein activating at least one of said interference suppression circuits in the local wireless device comprises activating acoustic echo suppression circuitry in the local wireless device.

15. The method of claim 13 wherein activating at least one of said interference suppression circuits in the local wireless device comprises activating noise suppression circuitry in the local wireless device.

16. The method of claim 13 wherein activating at least one of said interference suppression circuits in the local wireless device comprises activating acoustic echo suppression and noise suppression circuitry in the local wireless device.

17. The method of claim 13 wherein activating at least one of said interference suppression circuits in the local wireless device further comprises bypassing the at least one of said interference suppression circuits in the mobile station.

18. The method of claim 17 wherein bypassing the at least one of the interference suppression circuits in the mobile station comprises activating a switch in a mobile station to bypass the at least one of the interference suppression circuits in the mobile station and to operatively connect the short-range wireless transceiver to a wireless network transceiver in said mobile station.

19. The method of claim 10 further comprising negotiating properties of one or more audio processing circuits disposed within at feast one of the local wireless device and the mobile station.

20. The method of claim 19 wherein configuring the short-range wireless network connection comprises activating at least one of an equalizer, a limiter, and an automatic level control in at least one of the local wireless device and the mobile station based on the negotiated properties of the audio processing circuits.

21. The method of claim 20 wherein activating at least one of the equalizer, limiter, and automatic level control in said local wireless device comprises activating a switch in said local wireless device to operatively connect at least one of the equalizer, limiter, and automatic level control between the short-range wireless transceiver and a speaker in said local wireless device.

22. The method of claim 20 wherein activating at least one of the equalizer, limiter, and automatic level control in said mobile station comprises activating a switch in the mobile station to operatively connect at least one of said equalizer, limiter, and automatic level control between the short-range wireless transceiver and a speaker in the mobile station.

23. The method of claim 10 wherein initiating the short-range wireless network connection comprises initiating a voice command at the local wireless device.

24. The method of claim 10 further comprising negotiating one or more short-range wireless network profiles for push-to-talk operations.

* * * * *